(12) United States Patent
Jones (10) Patent No.: US 11,311,879 B2
(45) Date of Patent: Apr. 26, 2022

(54) MICROFLUIDIC DEVICE, SYSTEM, AND METHOD FOR REVERSING A FLOW THROUGH A MICROFLUIDIC CHANNEL

(71) Applicant: miDiagnostics NV, Leuven (BE)

(72) Inventor: Benjamin Jones, Leuven (BE)

(73) Assignee: miDiagnostics NV, Leuven (BE)

( * ) Notice: Subject to any disclaimer, the term of this patent is extended or adjusted under 35 U.S.C. 154(b) by 92 days.

(21) Appl. No.: 16/267,542

(22) Filed: Feb. 5, 2019

(65) Prior Publication Data

US 2019/0240662 A1 Aug. 8, 2019

(30) Foreign Application Priority Data

Feb. 5, 2018 (EP) .................................... 18155088

(51) Int. Cl.
 *B01L 3/00* (2006.01)
 *G01N 1/40* (2006.01)
(52) U.S. Cl.
 CPC ..... *B01L 3/502738* (2013.01); *B01L 3/50273* (2013.01); *B01L 3/502753* (2013.01); *B01L 3/502761* (2013.01); *B01L 2300/0681* (2013.01); *B01L 2300/0816* (2013.01); *B01L 2300/0861* (2013.01); *B01L 2300/0867* (2013.01); *B01L 2400/0406* (2013.01);
 (Continued)
(58) Field of Classification Search
 CPC ........... B01L 3/502738; B01L 3/50273; B01L 3/502753; B01L 3/502761; B01L 2300/0861; B01L 2300/0867; B01L 2400/0406; B01L 2400/049; B01L 2400/0688; B01L 2400/084; B01L 2300/0816; B01L 2400/0633; B01L 2300/0681; G01N 2001/4088
 See application file for complete search history.

(56) References Cited

U.S. PATENT DOCUMENTS 5,726,026 A 3/1998 Wilding et al.
6,581,899 B2 * 6/2003 Williams .............. B01F 5/0646
 251/7
(Continued)

FOREIGN PATENT DOCUMENTS

| DE | 102011086235 A1 | 5/2013 | |
| WO | WO-2013072110 A1 * | 5/2013 | ........ B01L 3/502761 |
| WO | 2019040599 A1 | 2/2019 | |

*Primary Examiner* — Jennifer Wecker
*Assistant Examiner* — Oyeleye Alexander Alabi
(74) *Attorney, Agent, or Firm* — Hodgson Russ LLP (57) ABSTRACT

There is provided a microfluidic device for reversing a flow through a microfluidic channel. The microfluidic device comprises a first microfluidic channel extending between a first inlet and a first outlet, a second microfluidic channel which fluidically connects a first point of the first microfluidic channel to a second outlet via a first valve, a third microfluidic channel which fluidically connects a second point of the first microfluidic channel to a second inlet via a second valve, the second point being located between the first point and the first outlet, and at least one circuit for opening the first valve and the second valve. The first and the second valves are arranged to be initially closed, Upon opening of the first and the second valve during use, the flow direction through the first microfluidic channel between the first point and the second point is reversed.

12 Claims, 6 Drawing Sheets

(52) U.S. Cl.
CPC . *B01L 2400/049* (2013.01); *B01L 2400/0633* (2013.01); *B01L 2400/0688* (2013.01); *B01L 2400/084* (2013.01); *G01N 2001/4088* (2013.01)

(56) References Cited

U.S. PATENT DOCUMENTS

| | | | |
|---|---|---|---|
| 2005/0130226 A1* | 6/2005 | Ahn | G01N 33/54353 |
| | | | 435/7.1 |
| 2005/0249641 A1 | 11/2005 | Blankenstein et al. | |
| 2010/0050749 A1 | 3/2010 | Yuan | |
| 2014/0332098 A1* | 11/2014 | Juncker | B01L 3/502738 |
| | | | 137/511 |

* cited by examiner

MICROFLUIDIC DEVICE, SYSTEM, AND METHOD FOR REVERSING A FLOW THROUGH A MICROFLUIDIC CHANNEL

CROSS-REFERENCE TO RELATED APPLICATION

This application claims priority to European Patent Application No. 18155088.0, filed on Feb. 5, 2018, the entire disclosure of which is incorporated herein by reference.

TECHNICAL FIELD

The present disclosure relates to a microfluidic device and a microfluidic system for reversing a flow through a microfluidic channel. The disclosure also relates to a method for reversing a flow through a microfluidic channel using the microfluidic system, and a diagnostic device comprising the microfluidic device.

BACKGROUND

Microfluidics deals with the behavior, precise control and manipulation of fluids that are geometrically constrained to a small, typically sub-millimeter, scale. Technology based on microfluidics are used for example in ink-jet printer heads, DNA chips and within lab-on-a-chip technology. In microfluidic applications, fluids are typically moved, mixed, separated or otherwise processed. In many applications, passive fluid control is used. This may be realized by utilizing the capillary forces that arise within the sub-millimeter tubes. By careful engineering of a so called capillary driven fluidic system, it may be possible to perform control and manipulation of fluids.

In some applications of microfluidics, it may be desirable to reverse the flow of fluid through a microfluidic channel. An example of such an application is cell purification where cells or microparticles are to be separated from other material in a sample fluid. For that purpose the microfluidic channel may include a cell trapping structure which traps or captures cells or microparticles when fluid flow is in a first direction and releases the cells when the fluid flow direction is reversed.

There is thus a need for microfluidic devices which allows for reversing a fluid flow through a microfluidic channel.

SUMMARY

Example embodiments provides a microfluidic device for reversing a flow through a microfluidic channel. The microfluidic device comprises a first microfluidic channel extending between a first inlet and a first outlet, a second microfluidic channel which fluidically connects a first point of the first microfluidic channel to a second outlet via a first valve, a third microfluidic channel which fluidically connects a second point of the first microfluidic channel to a second inlet via a second valve, the second point being located between the first point and the first outlet, and at least one circuit for opening the first valve and for opening the second valve. The first and the second valves are arranged to be initially closed, thereby causing fluid to initially flow in a first direction in the first microfluidic channel from the first inlet to the first outlet during use. However, upon opening both the first and second valves during use, the flow direction through the first microfluidic channel between the first point and the second point is reversed, and fluid flows from the second inlet via the first microfluidic channel to the second outlet.

BRIEF DESCRIPTIONS OF THE DRAWINGS

The above, as well as additional objects, features and advantages, will be better understood through the following illustrative and non-limiting detailed description of embodiments described herein, with reference to the appended drawings, where the same reference numerals will be used for similar elements, wherein.

DETAILED DESCRIPTION

In view of the above, it is an object to provide a microfluidic device, a system, and a method which allows for reversing a fluid flow through a microfluidic channel.

According to a first aspect, there is provided a microfluidic device for reversing a flow through a microfluidic channel, comprising:

a first microfluidic channel extending between a first inlet and a first outlet, a second microfluidic channel which fluidically connects a first point of the first microfluidic channel to a second outlet via a first valve, a third microfluidic channel which fluidically connects a second point of the first microfluidic channel to a second inlet via a second valve, the second point being located between the first point and the first outlet, wherein the first valve and the second valve are arranged to be initially closed to prevent fluid from the first microfluidic channel to reach the second outlet and the second inlet, respectively, such that, during use, fluid initially flows in the first microfluidic channel in a first direction from the first inlet to the first outlet, and at least one circuit for opening the first valve and for opening the second valve, wherein, upon the at least one circuit opening the first valve and the second valve during use, a flow direction through the first microfluidic channel between the first point and the second point is reversed from the first direction to a second direction as fluid flows from the second inlet via the first microfluidic channel to the second outlet.

The first and the second valve are thus arranged to control the flow in the first, second, and third microfluidic channels. Initially, when closed, the first and the second valve stop fluid flow in the second and the third microfluidic channel, and fluid flow is restricted to the first microfluidic channel in the direction from the first inlet to the first outlet. However, when the valves are opened as triggered by the at least one circuit, fluid flow is enabled also in the second and third microfluidic channels, and a fluid flow from the second inlet to the second outlet via the first microfluidic channel is established, thereby reversing the flow direction through the first microfluidic channel.

The first inlet may be any suitable inlet for receiving a fluid. The fluid may be a sample fluid. The first inlet may hence be a sample inlet. The sample fluid may, for instance, be a body fluid such as blood, saliva, or urine.

The second inlet may be any suitable inlet for receiving a fluid. The fluid may be a buffer fluid used in connection to analyzing a sample fluid. The second inlet may hence be a buffer inlet. The buffer fluid may, for instance, be a saline solution.

The at least one circuit may be any circuit suitable for opening the first valve and the second valve. The at least one circuit may be at least one actuating circuit. The at least one circuit may include a first circuit for opening the first valve and a second circuit for opening the second valve.

The first and the second outlet may be any suitable outlet to which a pump, such as a capillary pump or a vacuum source, may be connected.

A microfluidic channel is any suitable channel having a width and height being measured on a sub-millimeter scale, such as in tens of microns or even less. The microfluidic channels are typically capillary channels, i.e., having a width and a height being of such dimension that a fluid held therein is propelled to move forward by means of capillary forces.

The valves may be microfluidic valves, such as, for instance, capillary valves. Capillary valves typically stop the advancing liquid-vapor interface by an abrupt change in geometry that prevents further wetting by the liquid. As an example, the valves may be capillary trigger valves. Such valves are arranged to open up for passage of the fluid entering the valve through a main input upon the valve being reached by a control fluid entering the valve through a separate control input. As another example, the valves could be actuated electrically, such as being electrically-triggered capillary stop valves. The fluid is then actuated by using an electrode that advances the liquid-vapor interface through electrostatic forces past the abrupt change in geometry allowing the liquid vapor interface to proceed further downstream of the valve.

The microfluidic device may further comprise:

a first flow conduit with flow resistance R1 arranged in the first microfluidic channel between the first inlet and the first point, a second flow conduit with flow resistance R2 arranged in the first microfluidic channel between the second point and the first outlet, a third flow conduit with flow resistance R3 arranged in the second microfluidic channel between the first point and the first valve. The first flow conduit controls the flow rate from the first inlet, the second flow conduit controls the flow rate into the first outlet, and the third flow conduit controls the flow rate into the second outlet.

The flow conduits may generally be flow resistors having flow resistances R1, R2, R3.

The flow resistances of the flow conduits may satisfy the following condition:

$$p_{in,buffer}(R_1 + R_3)R_2 - p_{pump,2}(R_1 R_2) - p_{in,sample}(R_2 R_3) + p_{pump,1}(R_1 + R_3)R_{C3} > 0.$$

where $p_{in,buffer}$ and $p_{in,sample}$ are capillary pressures at the second inlet and the first inlet, respectively, $p_{pump,1}$ and $p_{pump,2}$ are the negative pressures of pumps which during use are connected to the first outlet and to the second outlet, respectively, and $R_{C3}$ is the flow resistance of the third microfluidic channel.

The above condition on the flow resistances and the pressures is a sufficient condition for establishing a reverse flow in the first microfluidic channel as will be demonstrated later.

As mentioned above, one possible application of the microfluidic device is to trap particles, such as cells or micro particles, in fluid provided to the first inlet. For that purpose, the microfluidic device may further comprise a particle trap, i.e., a particle trapping structure, arranged in the first microfluidic channel between the first point and the second point.

For example, the particle trap may be arranged to trap particles if the flow direction through the particle trap is in the first direction. The particle trap may further be arranged to release particles if the flow direction through the particle trap is in the second direction.

The at least one circuit may trigger the first valve to open in different ways. In particular, the at least one circuit may be arranged to trigger the first valve to be opened by using electrical signals or by using fluid from the second inlet. Both these ways of implementing the at least one circuit enable a design of the microfluidic device which allows the pumps to be off-chip, i.e., to be connected to the microfluidic device as separate entities.

According to embodiments, the at least one circuit includes a first microfluidic circuit which fluidically connects the first valve to the second inlet, such that, during use, the first valve is triggered to be opened as it is reached by fluid from the second inlet via the first microfluidic circuit. In this way, the first valve is hence triggered to open by using fluid from the second inlet.

According to other embodiments, the at least one circuit includes an electric circuit configured to electrically trigger the first valve to be opened. In this way, the first valve is hence triggered to open by using electrical signals, and no direct fluid passage from the second inlet to the first valve is needed.

It is to be understood that designs are also possible where the first valve is triggered by using fluid from the first inlet. For instance, the at least one circuit may comprise a microfluidic circuit which provides a direct fluid connection between the first inlet and the first valve (i.e., a fluid connection which is separate from the fluid connection provided by the first microfluidic channel and the second microfluidic channel). Such a design would also enable the pumps to be off-chip.

The at least one circuit may trigger the second valve to open by using fluid from the second inlet. For example, the at least one circuit may include a portion of the third microfluidic channel that fluidically connects the second valve to the second inlet, such that, during use, the second valve is triggered to be opened as it is reached by fluid from the second inlet via said portion of the third microfluidic channel.

With this arrangement, the second valve is thus triggered to open as it is reached by fluid from the second inlet. The timing of the opening of the second valve may be achieved in different ways. For example, the timing may be achieved by adding fluid to the second inlet at a desired point in time, such as at a point in time when it is desirable to reverse the flow in the first microfluidic channel.

However, in some situations it may be advantageous to control the timing automatically and more precisely. For that purpose, the microfluidic device may comprise means, such as a third valve, for controlling the provision of fluid from the second inlet to the second valve. More specifically, the portion of the third microfluidic channel may fluidically connect the second valve to the second inlet via a third valve which is arranged to be initially closed so as to prevent fluid from the second inlet to reach the second valve.

The third valve may be triggered to open in different ways, such as by using electrical signals or by using fluid from the second inlet. As an example of the latter, the at least one circuit may further include a second microfluidic circuit which fluidically connects the third valve to the second inlet, such that, during use, the third valve is triggered to be opened as it is reached by fluid from the second inlet via the second microfluidic circuit. By way of example, the second microfluidic circuit may be a microfluidic channel interconnecting the second inlet and the third valve. The length and dimensions of that microfluidic channel may be designed such that fluid from the second inlet reaches, and thereby triggers, the third valve after a predetermined time from entering the channel. As an example, of the former, the microfluidic device may further include an electric circuit configured to electrically trigger the third valve to be opened.

In some applications, the microfluidic device may be used to detect particles in a fluid. For that purpose, a portion of the second microfluidic channel that fluidically connects the first valve to the second pump inlet may include a detection channel for detection of particles in a fluid held by the detection channel.

The microfluidic device may have an open design, meaning that the microfluidic channels are non-covered, and thereby may exchange air with the surroundings. Alternatively, the microfluidic device may have, at least partly, a closed design, meaning that at least some (but typically all) of the microfluidic channels are covered by an air-tight cover. As such a cover prevents air from escaping the microfluidic channels, one may arrive at a situation where air get trapped in the microfluidic channels, resulting in problems with triggering the valves. In particular, such a problem could occur at the second valve if the third microfluidic channel is covered. To resolve that issue, when at least the third microfluidic channel is provided with an air-tight cover, a vent may be connected to the second valve to allow air to escape from the second valve.

According to a second aspect, there is provided a microfluidic system for reversing a flow through a microfluidic channel, comprising:
   a microfluidic device of the first aspect,
   a first pump connected to the first outlet, and
   a second pump connected to the second outlet.

According to a third aspect, there is provided a method for reversing a flow through a microfluidic channel using the microfluidic system of the second aspect, comprising:
   providing a sample fluid to the first inlet, thereby establishing an initial flow of sample fluid in the first microfluidic channel in a first direction from the first inlet to the first outlet;
   providing a buffer fluid to the second inlet; and
   opening, using the at least one circuit, the first valve and the second valve, thereby reversing a flow direction through the first microfluidic channel between the first point and the second point from the first direction to a second direction as buffer fluid flows from the second inlet via the first microfluidic channel to the second outlet.

According to a fourth aspect, there is provided a diagnostic device comprising the microfluidic device according to the first aspect. For example, the microfluidic device may form part of chip or a cartridge included in the diagnostic device for self-diagnostic purposes.

The second, third, and fourth aspects may generally have the same features and advantages as the first aspect. It is further noted that the inventive concepts relate to all possible combinations of features unless explicitly stated otherwise.

Example embodiments will now be described more fully hereinafter with reference to the accompanying drawings.

Figure 1:
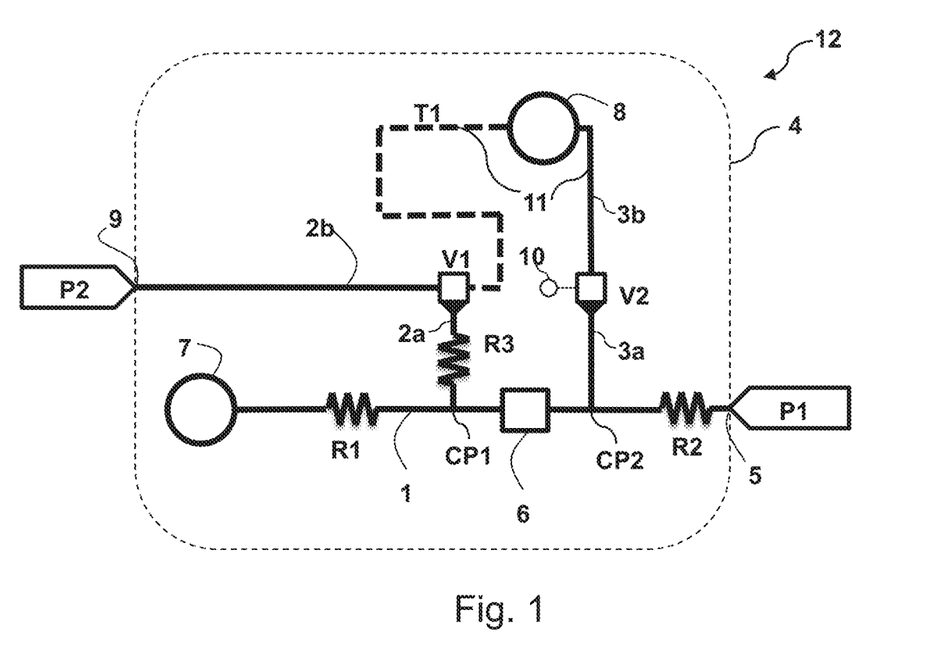
FIGS. 1-4 illustrate a microfluidic system for reversing a flow through a microfluidic channel according to various embodiments.

FIG. 1 illustrates a microfluidic system 12. The microfluidic system 12 includes a microfluidic device 4, a first pump P1, and a second pump P2. The first pump P1 is connected to a first outlet 5 of the microfluidic device 4, and the second pump P2 is connected to a second outlet 9 of the microfluidic device 4. The first and the second pumps P1, P2 may, for instance, be capillary pumps which are porous structures that sustains flow by generating a given capillary pressure, or vacuum sources. The pressures generated by the first pump P1 and the second pump P2 are denoted by $p_{pump,1}$ and $p_{pump,2}$, respectively.

The microfluidic device 4 and the pumps P1, P2 may be separate entities. For example, the microfluidic device 4 may be implemented on a chip, such as a semiconductor or a plastic chip, to which the pumps are P1, P2 are connected. Alternatively, the microfluidic device 4 and one or both of the pumps P1, P2 may be implemented on the same chip. Fabrication methods for the microfluidic device 4, and the structures thereof, such as the microfluidic channels, flow resistors, and valves, include, but are not limited to, etching techniques.

The microfluidic device 4 comprises a first microfluidic channel 1 which extends between a first inlet 7 and the first outlet 5. The first microfluidic channel 1 may be referred to as a primary channel.

The microfluidic device 4 further comprises a second microfluidic channel 2a, 2b. The second microfluidic channel 2a, 2b fluidically connects the first microfluidic channel 1 to the second outlet 9 via a first valve V1. In more detail, the second microfluidic channel 2a, 2b comprises a first portion 2a which connects a first point CP1 of the first microfluidic channel 1 to an inlet of the first valve V1, and a second portion 2b which connects an outlet of the first valve V1 to the second outlet 9.

The microfluidic device 4 further comprises a third microfluidic channel 3a, 3b which fluidically connects the first microfluidic channel 1 to a second inlet 8 via a second valve V2. More specifically, the third microfluidic channel has a first portion 3a which connects a second point CP2 of the first microfluidic channel 1 to an inlet of the second valve V2, and a second portion 3b which connects an outlet of the second valve V2 to the second inlet 8. The second point CP2 is located between the first point CP1 and the first outlet 5.

Optionally, a particle trap 6, a reaction chamber or similar, depending on the application, may arranged in the first microfluidic channel 1 between the first point CP1 and the second point CP2. The particle trap 6 may be arranged to trap particles such as cells or micro particles in a sample provided at the first inlet 7. The particle trap 6 may be arranged to trap particles as a flow direction through the particle trap is in a first direction, from the first inlet to the first outlet 5, and to release particles as a flow direction through the particle trap 6 is in the reverse direction. Many techniques for particle trapping exist, utilizing methods such as optical, acoustic, magnetic, electrohydrodynamic, or purely hydrodynamic forces. Hydrodynamic traps, for example, utilize arrays of structures with constrictions designed to trap particles when flowing in one direction. The structures typically allow particles to bypass around the structure once one particle is trapped within the structure so that the trap does not clog. The structures may then release the particles once flow is reversed in the trap with the particles flowing unhindered by the structures in the reverse flow direction. In order to facilitate detection of particles, the portion 2b of the second microfluidic channel may include a detection channel for detection of particles (as, for instance, released from the particle trap) in the fluid. Detection of the particles may be through, for example, optical or electrical means.

The microfluidic device 4 is a capillary-driven microfluidic network. In particular, all channels of the microfluidic device 4, such as the first, second, and third microfluidic channels 1, 2a, 2b, 3a, 3b are capillary channels, meaning that their traverse cross-sections are sufficiently small to allow capillary forces (a combination of surface tension and adhesive forces between the liquid fluid and the channel walls) to propel the fluid held therein.

The microfluidic device 4 may further comprise a first flow conduit with flow resistance R1, a second flow conduit with flow resistance R2, and a third flow conduit with flow resistance R3. The first flow conduit with flow resistance R1 controls the flow rate from the sample input 7, the second flow conduit with flow resistance R2 controls the flow rate into the first outlet 5, and the third flow conduit with flow resistance R3 controls the flow rate into the second outlet 9. The flow conduits may be microfluidic channels of certain cross-sectional dimension and length to generate the required resistance. In some embodiments, one or more of the flow conduits may be left out. Generally, the flow resistance of the first microfluidic channel between points CP1 and CP2 and the flow resistance of the third microfluidic channel 3a, 3b are assumed to be much smaller than the resistance R1, R2, and R3 of the flow conduits.

Each of the first and the second valve V1, V2 may be in a closed position and in an open position. When the first valve V1 is in a closed position it prevents fluid from the first microfluidic channel 1 to reach the second outlet 9. Similarly, when the second valve V2 is in a closed position it prevents fluid from the first microfluidic channel 1 to reach the second inlet 8. Both the first and the second valve V1, V2 are arranged to be initially closed, i.e., they are in a closed position as the microfluidic device 4 is first taken into use. When the first valve V1 is in an open position, it allows a flow in the direction towards the second outlet 9. When the second valve V2, which is a one-way valve, is in an open position, it allows a flow in the direction from the second inlet 8 towards the first microfluidic channel 1.

The first and the second valves V1 and V2 may be trigger valves, such as capillary trigger valves. The trigger valves may be passive, meaning that they may be passively triggered, such as by means of a fluid triggering the valve to open, or active, meaning that they are actively triggered, such as by means of an electrical control signal.

In order to control the opening of the first and the second valve V1, V2, the microfluidic device 4 comprises at least one circuit 11 arranged to open the first valve V1 and the second valve V2. The at least one circuit 11 may be arranged to trigger the first valve V1 to be opened by using electrical signals or by using fluid. The example embodiment of FIG. 1 is an example of the latter. In more detail, the at least one circuit 11 includes a first microfluidic circuit T1 which fluidically connects the second inlet 8 to a trigger channel of the first valve V1. The first microfluidic circuit T1 may be a microfluidic channel having a certain cross-sectional dimension and length so that the fluid takes a given amount of time to traverse the channel. In that way, the timing of the opening of the valve V1 may be controlled.

Figure 2:
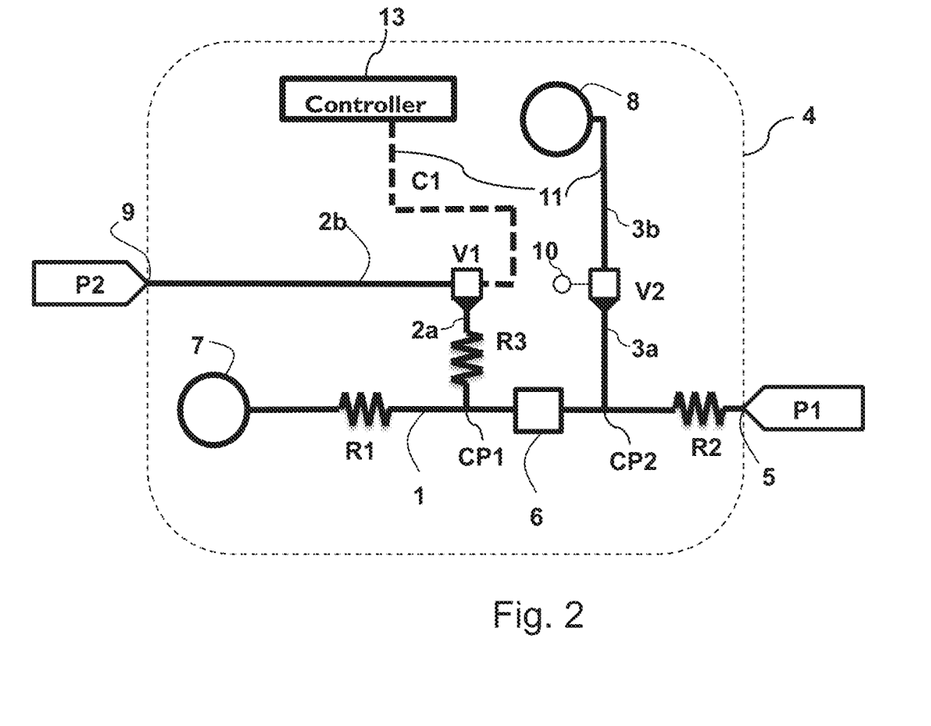

In an alternative embodiment, illustrated in FIG. 2, the at least one circuit 11 instead includes an electric circuit C1 configured to electrically trigger the first valve V1 to open, such as by sending an electric control signal to the first valve V1. The electric circuit C1 may be controlled by a controller 13 configured to generate the electric control signal. The controller 13 may be controlled to generate the electric control signal after a predetermined amount of time from, for instance, provision of a sample at the first inlet. In that way, the timing of the opening of the valve V1 may be controlled. The at least one circuit 11 is arranged to trigger the second valve V2 to be opened. As shown in the example embodiments of FIGS. 1 and 2, the second valve V2 may be triggered as fluid from the second inlet 8 reaches the second valve V2 via portion 3b of the third microfluidic channel 3a, 3b. The at least one circuit 11 may thus be said to include the portion 3b of the third microfluidic channel 3a, 3b.

Figure 3:
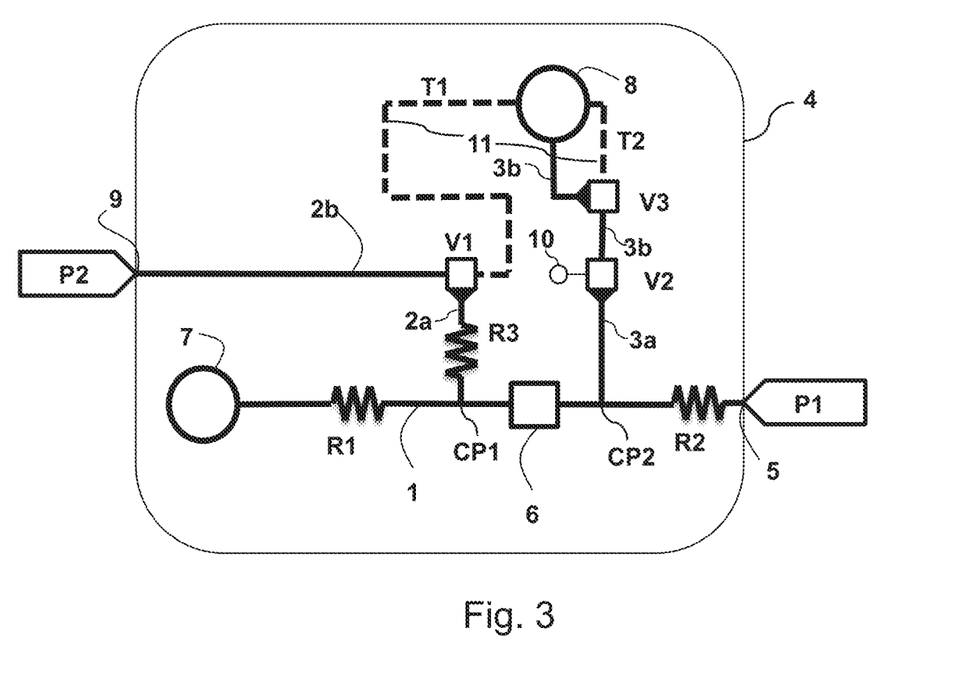
Figure 4:
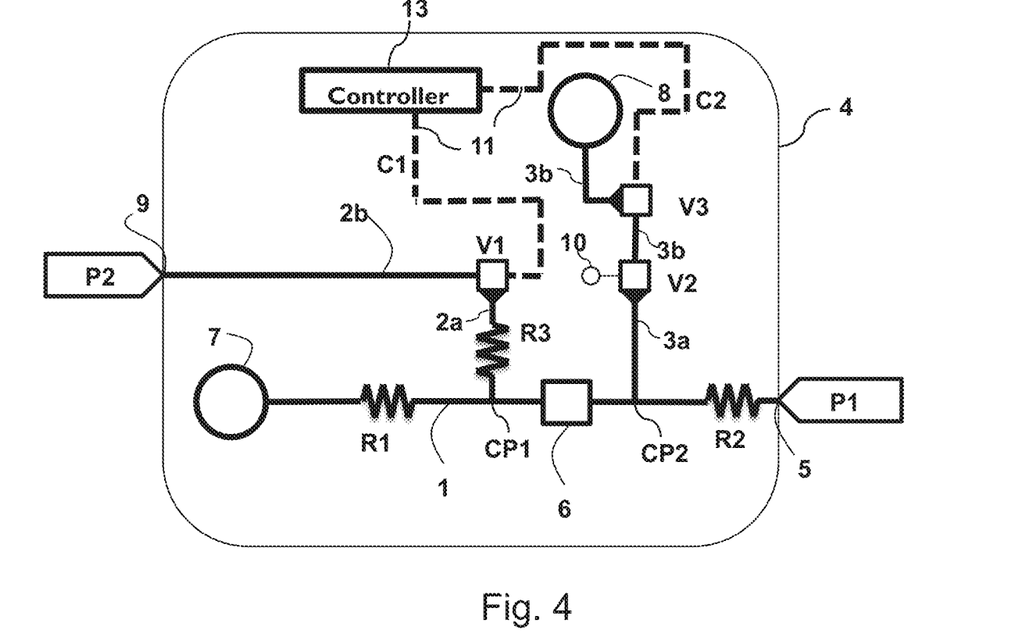

The timing of the opening of the second valve V2 as shown in FIGS. 1 and 2 is dependent on when a fluid is provided to the second inlet 8. In order to be able to more precisely control the opening of the second valve V2, the at least one circuit 11 may control the provision of fluid from the second inlet 8 to the second valve V2 by using a third valve V3 as shown in FIGS. 3 and 4. More specifically, a third valve V3 is arranged in the portion 3b of the third microfluidic channel, such that the portion 3b of the third microfluidic channel fluidically connects the second valve V2 to the second inlet 8 via the third valve V3.

Similar to the first and the second valves, the third valve V3 may be a trigger valve, such as capillary trigger valve. The trigger valve may be passive, meaning that it may be passively triggered, such as by means of a fluid triggering the valve to open, or active, meaning that it is actively triggered, such as by means of an electrical control signal.

The third valve V3 is arranged to be initially closed so as to prevent fluid from the second inlet 8 to reach the second valve V2. The at least one circuit 11 may further be arranged to trigger the third valve V3 to be opened, e.g., by using electrical signals or by using fluid from the second inlet 8. As the third valve V3 is opened, fluid from the second inlet 8 is allowed to flow to the second valve V2, thereby triggering the second valve V2 to be opened.

In the example embodiment of FIG. 3, the third valve V3 is triggered by means of fluid from the second inlet 8. For this purpose, the at least one circuit 11 includes a second microfluidic circuit T2 which is separate from the portion 3b of the third microfluidic channel and which fluidically connects a trigger channel of the third valve V3 to the second inlet 8. As fluid from the second inlet 8 reaches the third valve V3 via the second microfluidic circuit T2, during use, the third valve V3 will be opened, thereby allowing fluid from the second inlet 8 to flow through the third valve V3 towards the second valve V2 via channel 3b. The second microfluidic circuit T2 may be a microfluidic channel having a certain cross-sectional dimension and length so that the fluid takes a given amount of time to traverse the channel. In that way, the timing of the opening of the valve V3 (and thus also V2) may be controlled.

In an alternative embodiment, illustrated in FIG. 4, the at least one circuit 11 instead includes a second electric circuit C2 configured to electrically trigger the third valve V3 to open, such as by sending an electric control signal to the first valve V3. The electric circuit C2 may be controlled by a controller 13 configured to generate the electric control signal. The controller 13 may be controlled to generate the electric control signal after a predetermined amount of time from, for instance, provision of a sample at the first inlet. In that way, the timing of the opening of the valve V3 may be controlled.

The controller 13 may be implemented in software or hardware, or a combination thereof. For example, it may include a processor, such as a microprocessor, which in association with a non-transitory computer-readable storing computer code instructions is arranged to control the electric circuit C1 and/or C2 to open the first and/or the second valve V1, V2 to open. Alternatively, or additionally, the controller 13 may include circuitry, such as an integrated circuit, a field programmable gate array (FPGA) or similar, specifically designed for the purpose of controlling the electric circuit C1 and/or C2 to open the first and/or the second valve V1, V2 to open.

In the example embodiment of FIG. 3 both the first valve V1 and the third valve V3 are actuated to open by using fluid from the second inlet 8, and in the example embodiment of FIG. 4 both the first valve V1 and the third valve V3 are actuated to open by using electrical signals. However, it is to be understood that these embodiments may be combined such that one of first and the third valve V1, V3 is actuated by using electrical signals, and the other by using fluid from the second inlet. Embodiments may also be envisaged where one, or both, of the first valve V1 and the third valve V3 are actuated by using fluid from the first inlet (i.e., the first microfluidic circuit T1, may instead interconnect the first valve V1 with the first inlet 7 and/or the second microfluidic circuit T2 may interconnect the second valve V2 with the first inlet 7).

Any of the example embodiments may have an open or a closed design, meaning that the microfluidic device 4 and the channels thereof either have an open top surface, thereby allowing air to escape from the channels, or a covered top surface, thereby preventing air to escape from the channel. In the latter case, there is a risk of air being trapped in the channels. In particular, there is a risk that air is trapped in the third microfluidic channel 3a, 3b at the second valve V2. If that happens, the trapped air may prevent fluid from the second inlet 8 to reach the second valve V2, thereby preventing the second valve from being opened. In order to allow air to escape, the second valve V2 may be provided with a vent 10, such as a vent hole, which allows air to escape.

Figure 5:
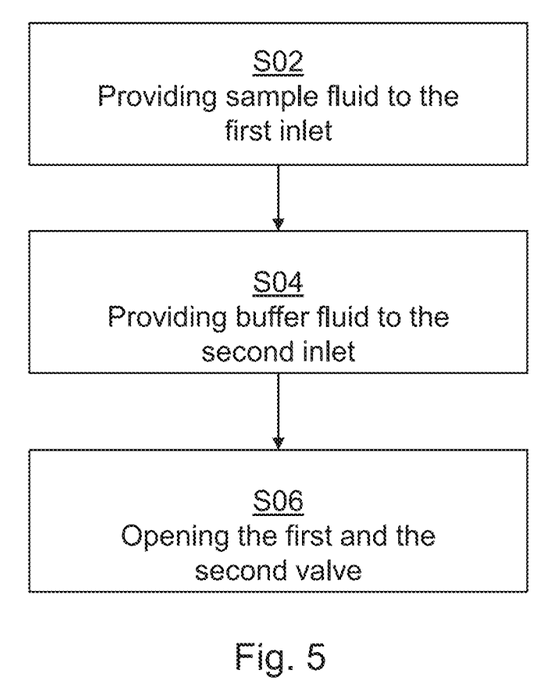
FIG. 5 is a flow chart of a method for reversing a flow through a microfluidic channel according to embodiments.

A method for reversing a flow through the first microfluidic channel 1 using the microfluidic system described above will now be described with reference to FIGS. 1-4, and the flow chart of FIG. 5.

In step S02, a sample fluid, such as blood, urine or similar, is provided to the first inlet 7. Upon provision of sample fluid to the first inlet 7, capillary forces in the first microfluidic channel 1 causes the sample fluid to be drawn into the first flow conduit with flow resistance R1. Upon reaching the first point CP1, the flow splits and proceeds simultaneously through the third flow conduit with flow resistance R3 located in the portion 2a of the second microfluidic channel and the first microfluidic channel 1 toward the second point CP2. After the sample fluid fills the third flow conduit with flow resistance R3, the flow is stopped by the first valve V1 which is in its closed position. The flow continues in the first microfluidic channel 1 until it reaches the second point CP2. Upon reaching the second point CP2, the flow splits and proceeds simultaneously into the portion 3a of the third microfluidic channel and into the second flow conduit with flow resistance R2. The sample fluid fills the portion 3a of the third microfluidic channel until it reaches the second valve V2 which is in its closed position. Further, after filling the second flow conduit with flow resistance R2, the sample fluid flows into the first capillary pump P1, which sustains a flow for a given period of time.

Meanwhile, buffer fluid, such as a saline solution, is provided to the second inlet 8. In case the microfluidic system has the design shown in FIGS. 3 and 4, the buffer fluid fills up the portion of the third microfluidic channel extending between the second inlet 8 until it reaches the third valve V3 which is in its closed position. In case the microfluidic system has the design shown in FIGS. 1 and 2, the buffer fluid proceeds towards the second valve V2.

In step S06, the first and the second valve V1, V2 are opened by using the at least one circuit 11 . In case the microfluidic system has the design of FIG. 1 or 2, the second valve V2 is opened as the buffer fluid reaches the second valve V2 through the portion 3b or the third microfluidic channel. In case the microfluidic system has the design of FIG. 3 or 4, the third valve V3 is actuated to open by means of the second microfluidic circuit T2 or the second electric circuit C2 after a desired time has elapsed. Once the third valve V3 has been opened, the flow proceeds in the portion 3b of the third microfluidic channel until it reaches the second valve V2, thereby triggering the second valve V2 to open. Meanwhile, the first valve V1 is opened by means of the first microfluidic circuit T1 shown in FIGS. 1 and 3, or by means of the first electric circuit C1. The mutual timing of the of the opening of the first and the second valve V1, V2 is not important, since a reverse flow is not established until both the first and the second valve V1, V2 have been opened. Once both the first and the second valve V1, V2 have been opened, the flow of buffer fluid proceeds through the portion 3a of the third microfluidic channel, via the first and the second microfluidic channel 1, 2a, 2b into the second pump P2.

Figure 6A:
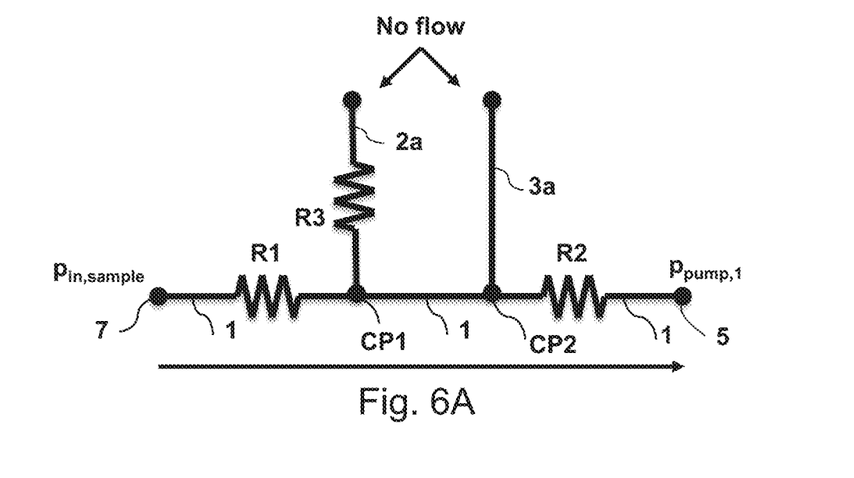
FIG. 6A illustrates a forward flow condition in the microfluidic system according to embodiments.

FIG. 6A illustrates the flow direction of the flow in the first microfluidic channel when the first and the second valves V1 and V2 are closed. The nodal pressure at the first inlet is denoted by $p_{in,sample}$. The $p_{in,sample}$ may be equal to 0 gauge pressure, i.e. equal to atmospheric pressure. The pressure of the first pump P1 is denoted $p_{pump,1}$, which is a negative pressure, i.e., below atmospheric pressure. In other words, $p_{in,sample} > p_{pump,1}$. Since the flow stops at valves V1 and V2, there is no flow through the third flow conduit with resistance R3 and the channel 3a. The flow in the first capillary channel 1 proceeds from high pressure to low pressure, i.e., in the direction from the first inlet 7 to the first outlet 5 as indicated by the arrow in FIG. 6A since $p_{in,sample} > p_{pump,1}$. In other words, flow in channel 1 proceeds from CP1 towards CP2 in a first direction.

FIG. 6A illustrates the flow direction of the flow in the first microfluidic channel 1 between points CP1 and CP2 when the first and the second valves V1 and V2 are open. The nodal pressure at the end of channel 3b is equal to the pressure at the second inlet 8 and is denoted by $p_{in,buffer}$. The $p_{in,buffer}$ may be equal to 0 gauge pressure, i.e. equal to atmospheric pressure. Further the nodal pressure at the end of channel 2b is equal to the pressure of the second pump P2 and is denoted by $p_{pump,2}$, which is a negative pressure, i.e., below atmospheric pressure. This induces a reverse flow condition in the first microfluidic channel 1 between points CP1 and CP2. It also induces a flow from the first inlet 7 into the capillary pump P2. This flow can be mitigated by increasing the resistance R1 of the first flow conduit. A flow is also induced from the second inlet 8 into capillary pump P1. This flow can be mitigated by increasing the resistance R2 of the second flow conduit.

Figure 6B:
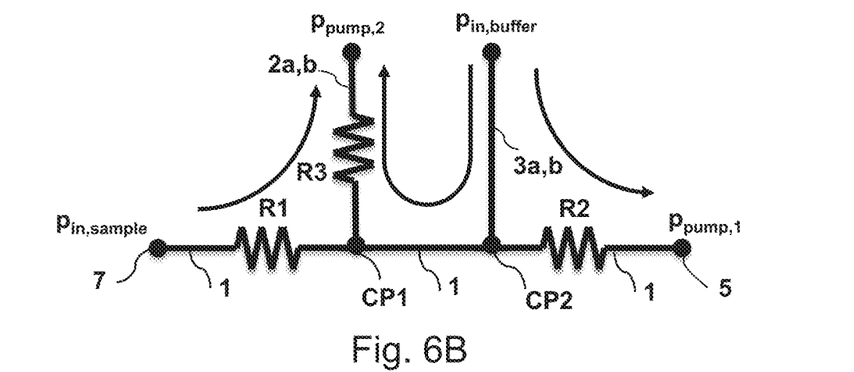
FIG. 6B illustrates a reverse flow condition in the microfluidic system according to embodiments.

The following equations describe the flows in the microfluidic device 4 when the first and the second valves V1 and V2 are open. Generally, Q denotes a flow, p denotes a pressure, and R describes a flow resistance. The flow $Q_1$ through the first flow conduit with resistance $R_1$ is described given by:

$$p_{in,sample} - p_{CP1} = R_1 Q_1,$$

where $p_{CP1}$ is the pressure at point CP1. The flow $Q_1$ through the first microfluidic channel 1 between points CP1 and CP2 is described by:

$$p_{CP2} - p_{CP1} = R_{C1} Q_{C1},$$

where $p_{CP2}$ is the pressure at point CP2 and $R_{C1}$ is the flow resistance of the first microfluidic channel between points CP1 and CP2. The flow $Q_3$ through the third flow flow conduit with flow resistance $R_3$ is described by:

$$p_{CP1} - p_{pump,2} = (R_3 + R_{C2b}) Q_3,$$

where $R_{C2b}$ is the flow resistance in portion 2b of the second microfluidic channel. The flow $Q_2$ through the second flow conduit with flow resistance $R_2$ is described by:

$$p_{CP2} - p_{pump,1} = R_2 Q_2$$

The flow $Q_{C3}$ in the third microfluidic channel 3a, 3b is described by:

$$p_{in,buffer} - p_{CP2} = R_{C3} Q_{C3}$$

where $R_{C3}$ is the flow resistance in the third microfluidic channel 3a, 3b. Further, the following equations regarding the split of the flows at points CP1 and CP2 should be fulfilled:

$$Q_1 + Q_{C1} = Q_3$$

$$Q_{C1} + Q_2 = Q_{C3}$$

Solving for the flow $Q_{C1}$ gives:

$$Q_{C1} = \frac{\begin{array}{c}p_{in,buffer}(R_1 R_2 + R_2 R_3 + R_2 R_{C2b}) - p_{pump,2}(R_1 R_2 + R_1 R_{C3}) - \\ p_{in,sample}(R_2 R_3 + R_3 R_{C3} + R_2 R_{C2b} + R_{C3} R_{C2b}) + \\ p_{pump,1}(R_1 R_{C3} + R_3 R_{C3} + R_{C3} R_{C2b})\end{array}}{\begin{array}{c}R_1 R_2 R_3 + R_1 R_2 R_{C1} + R_1 R_2 R_{C3} + R_2 R_3 R_{C1} + \\ R_1 R_3 R_{C3} + R_1 R_2 R_{C2b} + R_2 R_3 R_{C3} + R_1 R_{C1} R_{C3} + R_3 R_{C1} R_{C3} + \\ R_2 R_{C1} R_{C2b} + R_1 R_{C3} R_{C2b} + R_2 R_{C3} R_{C2b} + R_{C1} R_{C3} R_{C2b}\end{array}}$$

The reverse flow condition is satisfied if $Q_{C1} > 0$ so that $$p_{in,buffer}(R_1 R_2 + R_2(R_3 + R_{C2b})) - p_{pump,2}(R_1(R_2 + R_{C3})) - p_{in,sample}(R_2 + R_{C3})(R_3 + R_{C2b}) + p_{pump,1}(R_1 R_{C3} + R_{C3}(R_3 + R_{C2b})) > 0.$$

Assuming that:

$$R_{C2b} \ll R_3$$

$$R_{C3} \ll R_2$$

then the inequality can be simplified to:

$$p_{in,buffer}(R_1 + R_3) R_2 - p_{pump,2}(R_1 R_2) - p_{in,sample}(R_2 R_3) + p_{pump,1}(R_1 + R_3) R_{C3} > 0.$$

The above simplified inequality thus gives a sufficient condition, expressed in terms of flow resistances and pressures for having a reverse flow in the first microfluidic channel 1 between points CP1 and CP2 as the first and the second valves V1 and V2 are opened.

As further mentioned above, the purpose of resistance R3 is to control the flow rate into the first pump P1. During forward flow operation, the sum of resistances R1+R2 influences the flow rate through the first microfluidic channel 1 between points CP1 and CP2, i.e., through particle trap 6 if available, according to $p_{in,sample} - p_{pump,1} = (R_1 + R_2) Q_{C1}$. The purpose of R3 is to control the flow rate into the second pump P2 during reverse flow operation. The resistance R1 acts to limit the amount of sample flow from the first inlet 7 from flowing into the portion 2b of the second microfluidic channel, which may serve as a detection channel.

To illustrate, for a target flow rate through the particle trap 6 of 1 μL/min in the first direction and using pumps P1, P2 with pressures of −3 kPa (assuming $p_{in,sample}$ and $p_{in,buffer}$ being at 0 gauge pressure) then R1+R2=3 kPa*min/μL.

For R1 much greater than the flow resistances $R_{C1}$ and $R_{C3}$ of the first and the third microfluidic channels, the flow rate through the particle trap in reverse flow condition is largely independent on the precise value of R2, assuming a fixed value of R3. In this case, to reach a target flow rate of 1 μL/min in reverse flow condition, R3 should approximately be 3 kPa*min/μL (equivalent to a channel 50 μm wide by 50 μm high by 39.5 mm long, for reference). However, during reverse flow condition, it is generally desired to have a low flow rate coming from the first inlet 7 compared to the flow rate through the particle trap 6 (to minimize polluting the released particles from the trap with the sample) To minimize this flow rate, there is an optimum relation between R1 and R2, namely R1=R2. R1 and R2 should thus approximately both be equal to 1.5 kPa*min/μL in this example. For R3=3 kPa*min/μL, the resulting flow rate from the first inlet is approximately 3 nL/min (i.e., much lower than the flow rate through the particle trap 6).

If, on the other hand, R1 is much smaller than R2 and R3, and comparable in size to the flow resistances $R_{C1}$ and $R_{C3}$ of the first and the third microfluidic channels, the amount of sample fluid flowing through the portion 2b of the second microfluidic channel, which may serve as a detection channel, increases drastically. Again, for a target reverse particle trap flow rate of 1 μL/min, R3 is approximately 0.8 kPa*min/μL, while the flow rate from the first inlet 7 in the second microfluidic channel is about 3 μL/min. Reverse flow is still achievable under this conditions but depending on the application, the high sample flow rate relative to the particle trap flow rate may or may not be acceptable.

The embodiments herein are not limited to the above described examples. Various alternatives, modifications and equivalents may be used. Therefore, this disclosure should not be limited to the specific form set forth herein. This disclosure is limited only by the appended claims and other embodiments than the mentioned above are equally possible within the scope of the claims.

The invention claimed is:

1. A microfluidic device for reversing a flow through a microfluidic channel, comprising:
   a first microfluidic channel extending between a first inlet and a first outlet;
   a second microfluidic channel which fluidically connects a first point of the first microfluidic channel to a second outlet via a first capillary trigger valve;
   a third microfluidic channel which fluidically connects a second point of the first microfluidic channel to a second inlet via a second capillary trigger valve, the second point being located between the first point and the first outlet;

wherein the first capillary trigger valve and the second capillary trigger valve are arranged to be initially closed to prevent fluid from the first microfluidic channel to reach the second outlet and the second inlet, respectively, such that, during use, fluid initially flows in the first microfluidic channel in a first direction from the first inlet to the first outlet; and at least one circuit configured to open the first capillary trigger valve and configured to open the second capillary trigger valve, the at least one circuit comprising:

a first microfluidic circuit which fluidically connects the first capillary trigger valve to the second inlet, wherein the first capillary trigger valve is configured to be opened by fluid from the second inlet reaching the first capillary trigger valve via the first microfluidic circuit, and wherein the second capillary trigger valve is configured to be opened by fluid from the second inlet reaching the second capillary valve via a portion of the third microfluidic channel;

wherein, upon the at least one circuit opening the first capillary trigger valve and the second capillary trigger valve during use, a flow direction through the first microfluidic channel between the first point and the second point is reversed from the first direction to a second direction as fluid flows from the second inlet via the first microfluidic channel to the second outlet.

2. The microfluidic device according to claim 1, further comprising:

a first flow conduit with flow resistance R1 arranged in the first microfluidic channel between the first inlet and the first point, a second flow conduit with flow resistance R2 arranged in the first microfluidic channel between the second point and the first outlet, a third flow conduit with flow resistance R3 arranged in the second microfluidic channel between the first point and the first capillary trigger valve, wherein the first flow conduit controls the flow rate from the first inlet, the second flow conduit controls the flow rate into the first outlet, and the third flow conduit controls the flow rate into the second outlet.

3. The microfluidic device according to claim 2, wherein the flow resistance R1, the flow resistance R2, and the flow resistance R3 meet the following condition:

$$p_{in,buffer}(R_1 + R_3)R_2 - p_{pump,2}(R_1 R_2) - p_{in,sample}(R_2 R_3) + p_{pump,1}(R_1 + R_3)R_{C3} > 0$$

where $p_{in,buffer}$ and $p_{in,sample}$ are capillary pressures at the second inlet and the first inlet, respectively, $p_{pump,1}$ and $p_{pump,2}$ are the negative pressures of pumps which during use are connected to the first outlet and to the second outlet, respectively, and $R_{C3}$ is the flow resistance of the third microfluidic channel.

4. The microfluidic device according to claim 1, further comprising a particle trap arranged in the first microfluidic channel between the first point and the second point, wherein the particle trap is arranged to trap particles in the fluid as a flow direction through the particle trap is in the first direction.

5. The microfluidic device according to claim 4, wherein the particle trap is further arranged to release particles as a flow direction through the particle trap is in the second direction.

6. The microfluidic device according to claim 1, wherein the portion of the third microfluidic channel fluidically connects the second capillary trigger valve to the second inlet via a third capillary trigger valve which is arranged to be initially closed so as to prevent fluid from the second inlet to reach the second capillary trigger valve.

7. The microfluidic device according to claim 6, wherein the at least one circuit further includes a second microfluidic circuit which fluidically connects the third capillary trigger valve to the second inlet, such that, during use, the third capillary trigger valve is triggered to be opened as it is reached by fluid from the second inlet via the second microfluidic circuit.

8. The microfluidic device according to claim 1, wherein the at least one circuit further includes an electric circuit configured to electrically trigger the third capillary trigger valve to be opened.

9. The microfluidic device according to claim 1, wherein at least the third microfluidic channel is provided with an air-tight cover, and a vent is connected to the second capillary trigger valve to allow air to escape from the second capillary trigger valve.

10. A microfluidic system for reversing a flow through a microfluidic channel, comprising:

a microfluidic device according to claim 1;
a first pump connected to the first outlet; and
a second pump connected to the second outlet.

11. A method for reversing a flow through a microfluidic channel using the microfluidic system of claim 10, comprising:

providing a sample fluid to the first inlet, thereby establishing an initial flow of sample fluid in the first microfluidic channel in a first direction from the first inlet to the first outlet;

providing a buffer fluid to the second inlet; and opening, using the at least one circuit, the first capillary trigger valve and the second capillary trigger valve, thereby reversing a flow direction through the first microfluidic channel between the first point and the second point from the first direction to a second direction as buffer fluid flows from the second inlet via the first microfluidic channel to the second outlet.

12. An apparatus comprising:
a diagnostic device including a microfluidic device according to claim 1.

* * * * *